United States Patent
Huang et al.

(10) Patent No.: US 8,351,193 B2
(45) Date of Patent: Jan. 8, 2013

(54) COUPLING MECHANISM AND ELECTRONIC DEVICE USING SAME

(75) Inventors: Lian-Cheng Huang, Shenzhen (CN); Jian Li, Shenzhen (CN); Han-Zheng Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 287 days.

(21) Appl. No.: 12/915,272

(22) Filed: Oct. 29, 2010

(65) Prior Publication Data

US 2011/0235248 A1 Sep. 29, 2011

(30) Foreign Application Priority Data

Mar. 24, 2010 (CN) .......................... 2010 1 0131747

(51) Int. Cl.
*G06F 1/16* (2006.01)
(52) U.S. Cl. ................ 361/679.17; 439/535; 312/265.1; 248/309.1; 16/342
(58) Field of Classification Search .................. 439/377, 439/536, 535, 135, 64; 312/332.1, 333, 228, 312/223.2, 221, 216, 265.1, 265.6; 361/818, 361/679.33, 679.08, 679.46, 679.58, 679.43, 361/679.17, 679.35, 679.39, 679.34; 248/125.1, 590, 629, 209, 309.1, 276.1, 96; 16/252, 267, 245, 324, 342

See application file for complete search history.

(56) References Cited

U.S. PATENT DOCUMENTS

| 7,578,243 | B2 * | 8/2009 | Gevaert ........................... 108/25 |
| 2011/0175421 | A1 * | 7/2011 | Grable ........................... 297/408 |

FOREIGN PATENT DOCUMENTS

| CN | 2615824 Y | 5/2004 |
| CN | 2831214 Y | 10/2006 |

\* cited by examiner

*Primary Examiner* — Hung Duong
(74) *Attorney, Agent, or Firm* — Altis Law Group, Inc.

(57) ABSTRACT

A coupling mechanism includes a pivot assembly and a lifting assembly. The pivot assembly includes a first bracket, a pivot pin, a second bracket, and a cam piece. The second bracket is rotatably mounted to the first bracket via the pivot pin and has a valley portion recessed from one surface thereof. The cam piece is mounted to the pivot pin for holding the second bracket at any angle. The cam piece has a peak portion formed on one surface thereof and received in the valley portion of the second bracket at a closed position. The lifting assembly is adjustably assembled to the second bracket such that the lifting assembly is pivotally assembled with the first bracket.

20 Claims, 5 Drawing Sheets

COUPLING MECHANISM AND ELECTRONIC DEVICE USING SAME

BACKGROUND

1. Technical Field

The present disclosure relates to device construction, and particularly to a coupling mechanism for an electronic device and electronic device using the same.

2. Description of Related Art

Electronic devices are often characterized by slimness, light weight, and portability to meet user demand Convenience of use and low price are also significant priorities.

Conventionally, a notebook computer and its display are hinged together. Relative positioning of the notebook computer and its display, however, is not available. Further, no height adjustment of the display can be performed.

Therefore, there is room for improvement within the art.

BRIEF DESCRIPTION OF THE DRAWINGS

Many aspects of the disclosure can be better understood with reference to the following drawings. These drawings are not necessarily drawn to scale, the emphasis instead being placed upon clearly illustrating the principles of the coupling mechanism and electronic device using same. Moreover, in the drawings like reference numerals designate corresponding sections throughout the several views.

DETAILED DESCRIPTION

Figure 1:
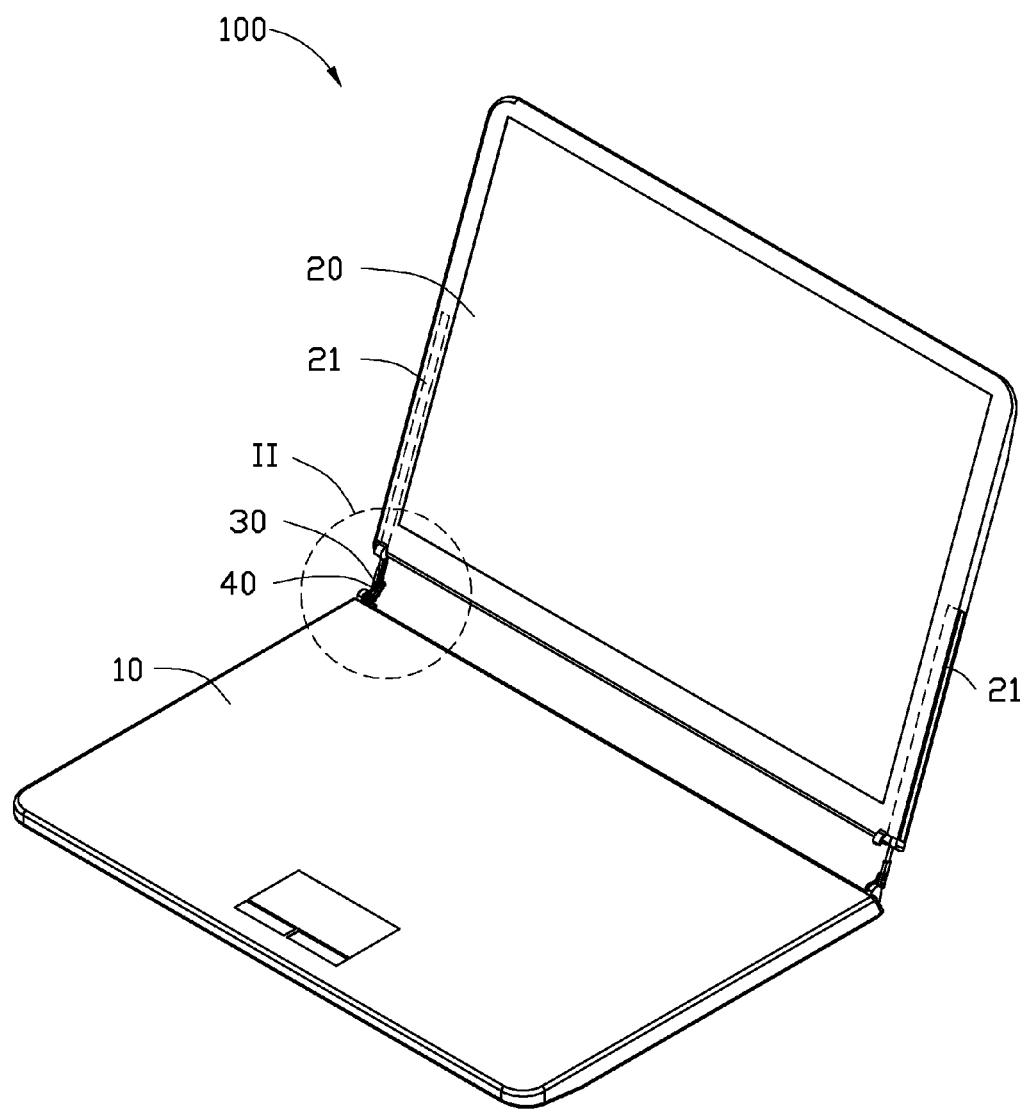
FIG. 1 is an assembled isometric view of an electronic device incorporating a coupling mechanism coupling a display to a main body of the electronic device, in accordance with an embodiment.

Referring to FIG. 1, an embodiment of an electronic device 100 incorporating an embodiment of a coupling mechanism 30 is shown. The electronic device 100 described here may be a notebook computer, a mobile phone, an MP3 player, a digital camera or a personal digital assistant (PDA). The electronic device 100 includes a main body 10, a display 20, the coupling mechanism 30, and a cable guide 40. The coupling mechanism 30 is positioned between and pivotally couples the display 20 to the main body 10 and slidably adjusts the height of the display 20 relative to the main body 10. The cable guide 40 is assembled alongside the coupling mechanism 30 guiding cables between the main body 10 and the display 20.

Figure 2:
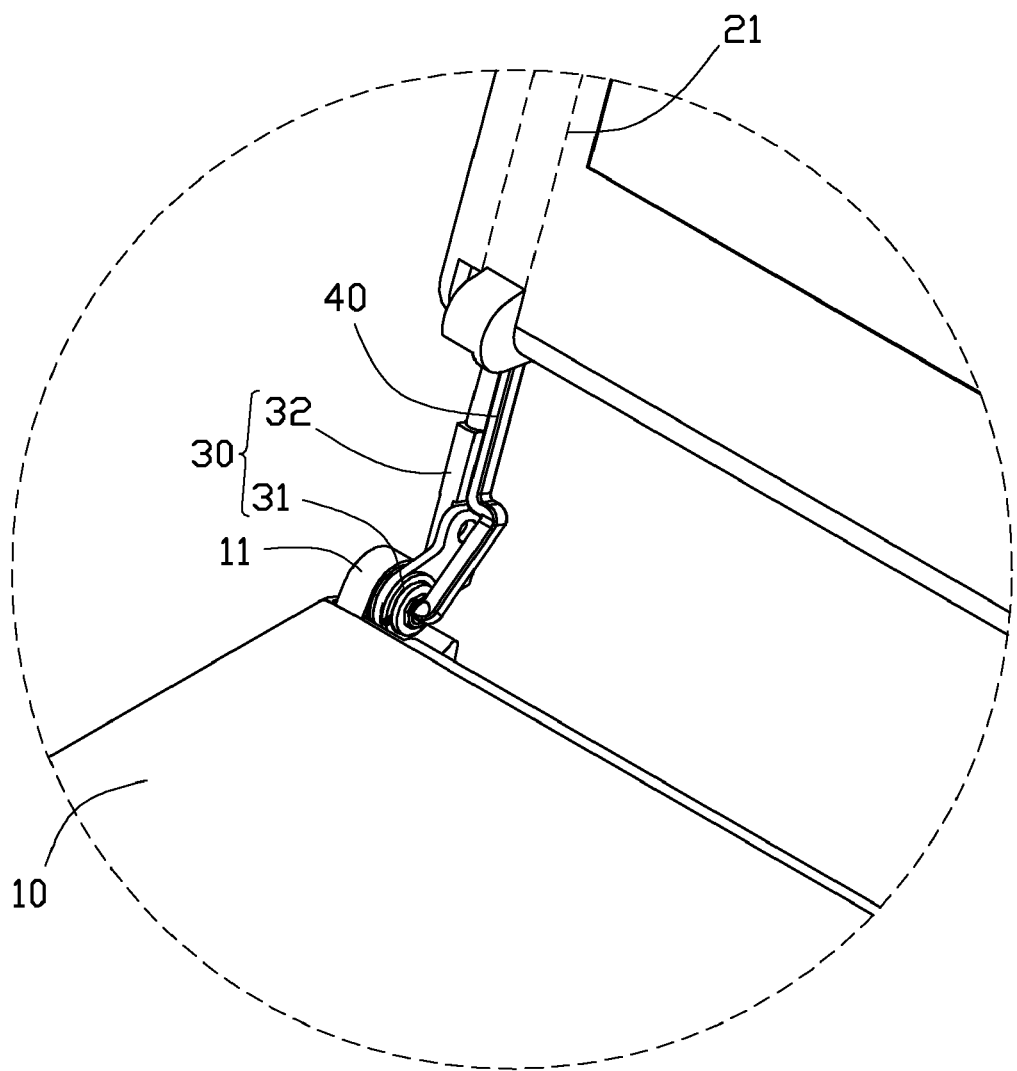
FIG. 2 is an enlarged view of section II shown in FIG. 1.

Also referring to FIG. 2, the main body 10 is substantially rectangular and includes two assembly portions 11 at one distal end of the main body 10 and located adjacent to two opposite sides of the main body 10. The display 20 is substantially rectangular and defines two assembling slots 21 at one distal end of the display 20 corresponding to the two assembling portions 11 of the main body 10 respectively. The two assembling slots 21 are located adjacent to and substantially parallel to two opposite sides of the display 20 respectively.

Figure 3:
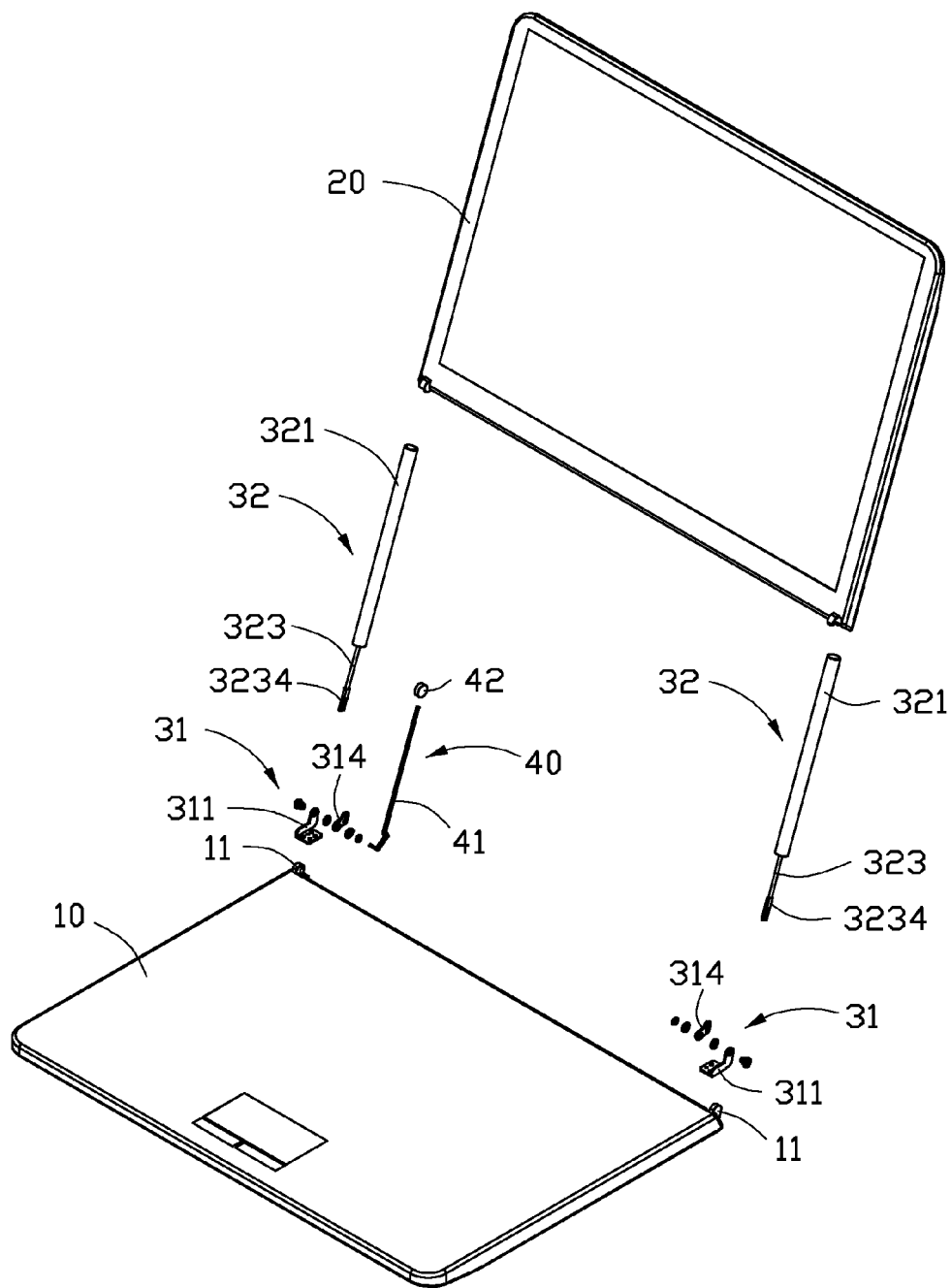
FIG. 3 is an exploded isometric view of the electronic device in FIG. 1.
Figure 4:
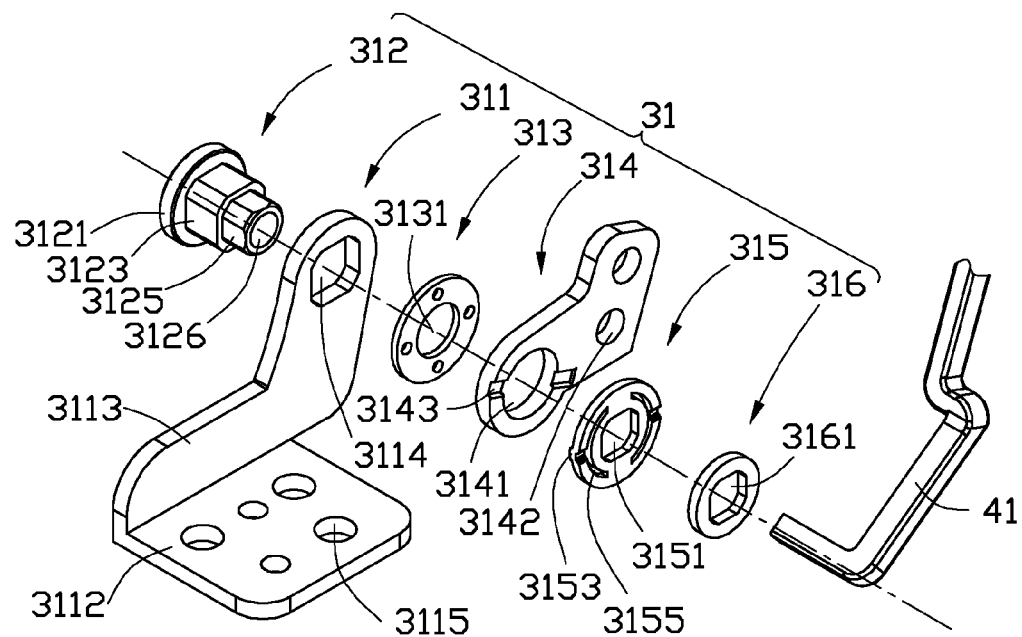
FIG. 4 is an exploded isometric view of a pivot assembly of the coupling mechanism shown in FIG. 1.

Also referring to FIGS. 3 and 4, the coupling mechanism 30 pivotally couples the display 20 to the main body 10 and provides height adjustment of the display 20 relative to the main body 10 to achieve an optimum viewing angle. The coupling mechanism 30 includes at least one pivot assembly 31 and at least one lifting assembly 32 assembled with the at least one pivot assembly 31. In this embodiment, the coupling mechanism 30 includes two pivot assemblies 31 and two lifting assemblies 32. The two pivot assemblies 31 are mounted to the two corresponding assembling portions 11 of the main body 10 respectively, and further assembled with the two corresponding lifting assemblies 32, such that the two lifting assemblies 32 are rotatably assembled to the main body 10. The two lifting assemblies 32 are further adjustably assembled to the display 20, pivotally coupling and providing height adjustment of the display 20 to the main body 10.

Each pivot assembly 31 includes a first bracket 311, a pivot pin 312, a wearing piece 313, a second bracket 314, a cam piece 315, and a lock piece 316. The first bracket 311 is substantially L-shaped and includes a first connecting plate 3112 and a second connecting plate 3113 extending from one edge of the first connecting plate 3112. The first connecting plate 3112 defines at least one fixing hole 3115 therethrough for being secured to one corresponding assembling portion 11 of the main body 10. A non-circular mounting hole 3114 is defined through the second connecting plate 3113. In the embodiment, the non-circular mounting hole 3114 is a substantially rectangular hole.

The pivot pin 312 is a substantially stepped shaft, and includes a stopper portion 3121, a first connecting portion 3123, and a second connecting portion 3125 coaxially connecting with each other in that order. The stopper portion 3121 and the second connecting portion 3125 are positioned at two ends of the first connecting portion 3123 respectively. Both of the first connecting portion 3123 and the second connecting portion 3125 are substantially rectangular columns. The axial diameter of first connecting portion 3123 is greater than the axial diameter of the second connecting portion 3125, but less than the axial diameter of the stopper portion 3121. The axial diameter of the first connecting portion 3123 is substantially the same as that of the mounting hole 3114 of the first bracket 311, such that the first connecting portion 3123 of the pivot pin 312 can pass through the mounting hole 3114 of the first bracket 311 and non-rotatably assemble to the first bracket 311. The pivot pin 312 further defines a line hole 3126 therethrough axially.

The wearing piece 313 is substantially disk shaped and includes a through hole 3131 defined through the central portion thereof. The wearing piece 313 is wound around the first connecting portion 3123 of the pivot pin 312 and is tightly sandwiched between the first bracket 311 and the second bracket 314. The wearing piece 313 can hold the second bracket 314 relative to the first bracket 311 at any angle defined by the first bracket 311 and the second bracket 314.

The second bracket 314 is rotatably assembled with the first bracket 311 via the pivot pin 312. The second bracket 314 is substantially plate shaped, and defines a pivot hole 3141 through one end thereof corresponding to the first connecting portion 3123 of the pivot pin 312. At least one securing hole 3142 is defined through the opposite end of the second bracket 314 for securing the second bracket 314 to the corresponding lifting assembly 32. A valley portion 3143 is recessed from one surface of the second bracket 314 and is located adjacent to the pivot hole 3141.

The cam piece 315 is substantially disk shaped and is mounted to the second connecting portion 3125 of the pivot pin 312 for holding the second bracket 314 together with the wearing piece 313 at any angle formed by the first bracket 311 and the second bracket 314. The cam piece 315 defines a non-circular assembling hole 3151 through the central portion thereof, with substantially the same dimension as the second connecting portion 3125. A peak portion 3153 is formed on one surface of the cam piece 315 and is positioned adjacent to the assembling hole 3151, corresponding to the valley portion 3143 of the second bracket 314. When the display 20 is in a closed position and overlaps the main body 10, the peak portion 3153 of the cam piece 315 is received in and latches into the valley portion 3143 of the second bracket 314, maintaining the display 20 in the closed position. A plurality of curved slots 3155 is defined through the cam piece 315 and surrounds the periphery of the assembling hole 3151 for enhancing the elasticity of the cam piece 315.

The lock piece 316 is a disc shaped washer fixed to the second connecting portion 3125 of the pivot pin 312. The lock piece 316 has a non-circular assembling hole 3161 defined through the central portion thereof, with substantially the same dimension as that of the second connecting portion 3125 and the assembling hole 3151 of the cam piece 315.

Figure 5:
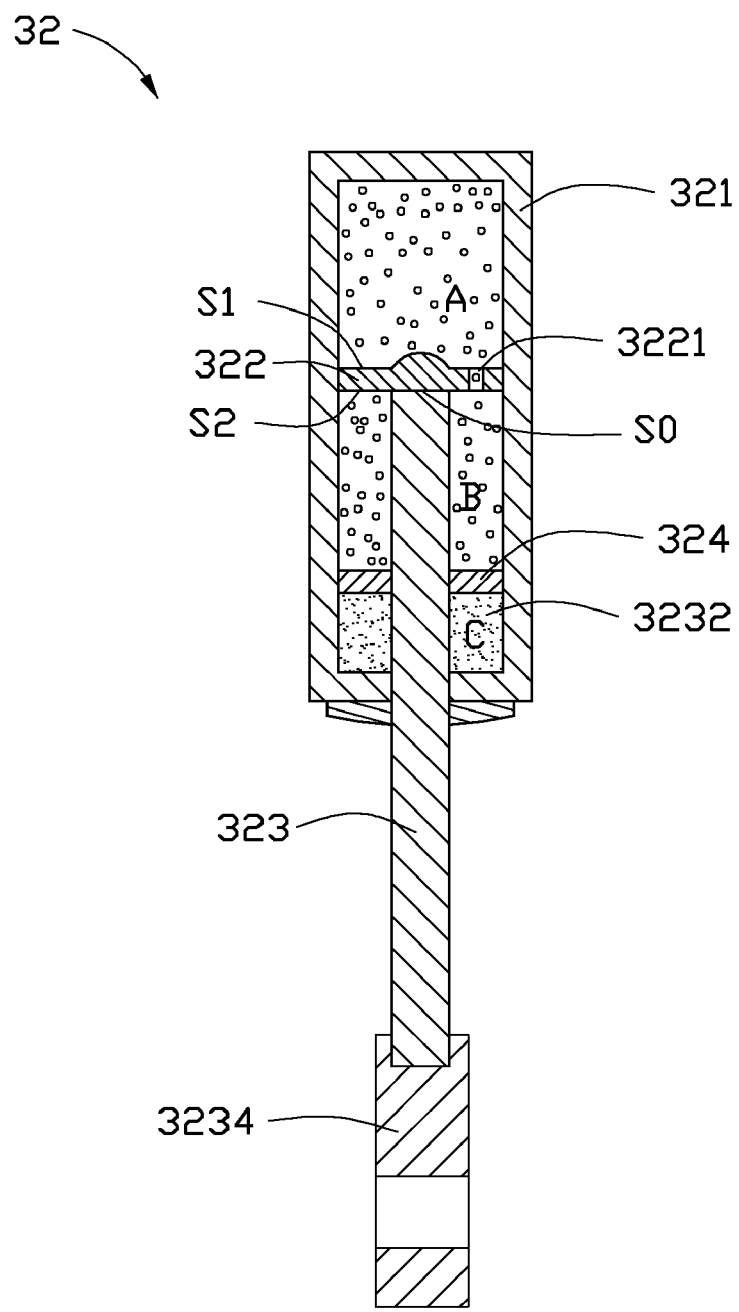
FIG. 5 is a cross-section of a lifting assembly shown in FIG. 1.

Also referring to FIG. 5, each lifting assembly 32 includes a cylinder 321, a first piston 322, a piston rod 323, and a second piston 324. The first piston 322 is assembled within the cylinder 321 and fixed to one end of the piston rod 323. The opposite end of the piston rod 323 is exposed to the exterior of the cylinder 321 and includes a mounting portion 3234 formed on the distal end of the piston rod 323, for assembling with the second bracket 314 of a corresponding pivot assembly 31. The second piston 324 is adjustably and slidably attached to the piston rod 323 and hermetically received within the cylinder 321, such that the inner space of the cylinder 321 is divided into three parts: A, B and C by the first piston 322 and the second piston 324. An air hole 3221 is defined through the first piston 322, such that part A and part B can communicate with each other and equalize gas pressure. Part A and part B of the cylinder 321 is filled with a preset gas, and part C of the cylinder is filled with oil 3232 to further prevent gas filled in part A and part B from leaking from the cylinder 321 and adjusting the gas pressure within the cylinder 321 by changing the volume of the oil 3232 in part C.

During use of the lifting assembly 32, the cylinder 321 is fixedly assembled and received within one corresponding assembling slot 21 of the display 20, and the opposite distal end of the piston rod 323 exposed to the exterior is fixed to the second bracket 314 of the pivot assembly 31 via the mounting portion 3234. Referring to FIG. 5, if the gas pressure of part A and part B of the cylinder 321 is $P_0$, the cross sectional area of the piston rod 323 is $S_0$, the cross sectional area of the first piston 322 is $S_1$, and the cross sectional area of the first piston 323 toward part B is $S_2$, the force $F_1$ acting on area $S_1$ toward the first piston 322 is $F_1=P_0S_1$ and the force $F_2$ acting on area $S_2$ toward the first piston 322 is $F_2=P_0S_2$.

Because of the relationship among the cross sectional area of the piston rod 323 $S_0$, the cross sectional area of the first piston 322 $S_1$, and the cross sectional area of the first piston 323 toward part B $S_2$ is $S_2=S_1-S_0$, the force $F_2$ acting on area $S_2$ toward the first piston 322 also can be expressed as:

$$F_2=P_0S_2=P_0(S_1-S_0).$$

Accordingly, the pressure difference acting on the first piston 322 is:

$$\Delta F=F_1-F_2=P_0S_1-P_0S_2=P_0(S_1-S_2)=P_0[S_1-(S_1-S_0)]$$
$$=P_0S_0$$

Meanwhile, as the piston rod 323 is fixed to the main body 10 and cannot move, the cylinder 321 may suffer an anti force $\Delta F'$ equal to that of the $\Delta F$, such that the anti force $\Delta F'$ may impel the cylinder 321 away from the piston rod 323.

The entire anti force $\Delta F'$ acting on the cylinder 321 side approximately equals the full weight of the display 20. In this embodiment, there are two lifting assemblies 32, such that the anti force $\Delta F'$ acting on one cylinder 321 approximately equals half the weight of the display 20, and because the display 20 is fixed to the two cylinders 321 of the two lifting assemblies 32, the display 20 and the two lifting assemblies 32 may together form a balance. Thus, minimal force is required to elevate or lower the display 20, which can move upward or downward relative to the piston rod 323 and quickly assume a preferred position.

If a display 20 with different weight is mounted to the cylinder 321, only the full volume (part A plus part B) of the cylinder 321 requires adjustment by changing the volume of the oil 3232 of part C until the anti force $\Delta F'$ acting on the cylinder 321 is approximately equal to the weight of the display 20. It is understood that gas pressure $P_0$ in part A and part B of the cylinder 321 can be adjusted.

Referring also to FIGS. 3 and 4, the coiling mechanism 40 includes a connecting piece 41 and a take up reel 42. The connecting piece 41 is hollow and tubular and includes a cable guiding hole (not shown) defined therethrough for guiding cables. The take up reel 42 is received in the assembling slot 21 of the display 20 and automatically coils electric cables between the main body 10 and the display 20.

As shown in FIGS. 2-5, the second connecting portion 3125 end of the pivot pin 312 aligns with and passes through the mounting hole 3114 of the first bracket 311. The mounting hole 3114 is then fixedly mounted to the connecting portion 3123 of the pivot pin 312. The wearing piece 313 and the second bracket 314 are rotatably mounted to the connecting portion 3123 of the pivot pin 312 in order, and the connecting portion 3125 end of the pivot pin 312 passes through the through hole 3131 of the wearing piece 313 and the pivot hole 3141 of the second bracket 314 in turn. The wearing piece 313 is then tightly sandwiched between the stopper portion 3121 and the second bracket 314. The cam piece 315 is fixedly mounted to the second connecting portion 3125 of the pivot pin 312 with the peak portion 3153 engaging into the corresponding valley portion 3143 of the second bracket 314. The lock piece 316 is fixed to the distal end of the second connecting portion 3125 of the pivot pin 312 to complete the assembly of one pivot assembly 31.

During assembly of the electronic device 100, the first brackets 311 of the two assembled pivot assemblies 31 are respectively assembled to the two assembly portions 11 of the main body 10. The cylinders 321 of the two lifting assemblies 32 are respectively fixed to and received within the corresponding two assembling slots 21 of the display 20, and the opposite distal ends of the piston rods 323 of the two lifting assemblies 32 are respectively fixed to the two second brackets 314 of the two assembled pivot assemblies 31. One end of the connecting piece 42 is inserted into the line hole 3126 of one pivot pin 312, and the opposite end of the connecting piece 42 is inserted into the corresponding one assembling slot 21 of the display 20. The electric cables pass through and are received within the connecting piece 42. The take up reel 42 is rotatably assembled to the distal end of the connecting piece 42 and received within the assembling slot 21 of the display 20.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A coupling mechanism comprising:
    a pivot assembly comprising:
        a first bracket;
        a pivot pin;
        a second bracket rotatably mounted to the first bracket via the pivot pin and having a valley portion recessed from one surface of the second bracket; and
        a cam piece mounted to the pivot pin for holding the second bracket at any angle formed by the first bracket and the second bracket, the cam piece having a peak portion formed on one surface of the cam piece and engaging with the valley portion of the second bracket at a closed position; and
    a lifting assembly adjustably assembled to the second bracket of the pivot assembly such that the lifting assembly is pivotally assembled with the first bracket.

2. The coupling mechanism as claimed in claim 1, wherein the lifting assembly comprises a cylinder, a first piston, a piston rod, and a second piston, the first piston is slidably assembled within the cylinder and fixed to one end of the piston rod, and the opposite end of the piston rod is exposed to the exterior of the cylinder and is fixed with the second bracket of the pivot assembly.

3. The coupling mechanism as claimed in claim 2, wherein the lifting assembly further comprises a second piston adjustably and slidably attached to the piston rod and hermetically received within the cylinder such that an inner space of the cylinder is divided into three parts by the first piston and the second piston; the first piston defines an air hole therethrough to ensure the two sides of the first piston have approximately the same gas pressure.

4. The coupling mechanism as claimed in claim 3, wherein the inner space formed by the second piston and the cylinder away from the first piston is filled with oil to prevent the gas from leaking from the cylinder and adjusting the gas pressure within the cylinder by changing the volume of the oil.

5. The coupling mechanism as claimed in claim 1, wherein the pivot pin is a stepped shaft and includes a stopper portion, a first connecting portion, and a second connecting portion coaxially connecting with each other, the stopper portion and the second connecting portion being positioned at two ends of the first connecting portion respectively; the first bracket defines a non-circular mounting hole and is fixedly attached to the first connecting portion, and the second bracket defines a pivot hole and is rotatably mounted to the first connecting portion of the pivot pin.

6. The coupling mechanism as claimed in claim 5, wherein the cam piece defines a non-circular assembling hole with substantially the same shape as the second connecting portion, and the cam piece is secured to the second connecting portion of the pivot pin and tightly abuts against the second bracket.

7. The coupling mechanism as claimed in claim 6, wherein the pivot assembly further comprises a wearing piece wound around the first connecting portion of the pivot pin, the wearing piece being tightly sandwiched between the first bracket and the second bracket.

8. The coupling mechanism as claimed in claim 7, wherein the pivot assembly further comprises a lock piece fixed to the distal end of the second connecting portion of the pivot pin.

9. The coupling mechanism as claimed in claim 6, wherein the cam piece further defines a plurality of curved slots therethrough positioned surrounding the periphery of the assembling hole.

10. An electronic device comprising:
    a main body;
    a display; and
    a coupling mechanism positioned between the main body and the display for pivotally coupling the display to the main body and providing height adjustment of the display relative to the main body; the coupling mechanism comprising:
        a pivot assembly comprising:
            a first bracket assembled to the main body;
            a pivot pin;
            a second bracket rotatably mounted to the first bracket via the pivot pin and having a valley portion recessed from one surface of the second bracket; and
            a cam piece mounted to the pivot pin for holding the second bracket at any angle formed by the first bracket and the second bracket, the cam piece having a peak portion formed on one surface of the cam piece and engaging with the valley portion of the second bracket at a closed position; and
        a lifting assembly adjustably assembled to the second bracket of the pivot assembly and mounted with the display such that the display is pivotally and slidably adjustably assembled to the main body.

11. The electronic device as claimed in claim 10, wherein the lifting assembly comprises a cylinder, a first piston, a piston rod, and a second piston, the first piston is slidably assembled within the cylinder and fixed to one end of the piston rod, and the opposite end of the piston rod is exposed to the exterior of the cylinder and is fixed with the second bracket of the pivot assembly.

12. The electronic device as claimed in claim 11, wherein the lifting assembly further comprises a second piston adjustably and slidably attached to the piston rod and hermetically received within the cylinder such that an inner space of the cylinder is divided into three parts by the first piston and the second piston; the first piston defines an air hole therethrough to ensure the two sides of the first piston have approximately the same gas pressure.

13. The electronic device as claimed in claim 12, wherein the inner space formed by the second piston and the cylinder away from the first piston is filled with oil to prevent the gas from leaking from the cylinder and adjusting the gas pressure within the cylinder by changing the volume of the oil.

14. The electronic device as claimed in claim 10, wherein the pivot pin is a stepped shaft and includes a stopper portion, a first connecting portion, and a second connecting portion coaxially connecting with each other, the stopper portion and the second connecting portion being positioned at two ends of the first connecting portion respectively; the first bracket defines a non-circular mounting hole and is fixedly attached to the first connecting portion, and the second bracket defines a pivot hole and is rotatably mounted to the first connecting portion of the pivot pin.

15. The electronic device as claimed in claim 14, wherein the cam piece defines a non-circular assembling hole with substantially the same shape as the second connecting portion, and the cam piece is secured to the second connecting portion of the pivot pin and tightly abuts against the second bracket.

16. The electronic device as claimed in claim 15, wherein the pivot assembly further comprises a wearing piece wound around the first connecting portion of the pivot pin, and the wearing piece is tightly sandwiched between the first bracket and the second bracket.

17. The electronic device as claimed in claim 16, wherein the pivot assembly further comprises a lock piece fixed to the distal end of the second connecting portion of the pivot pin.

18. The electronic device as claimed in claim 15, wherein the cam piece further defines a plurality of curved slots therethrough positioned surrounding the periphery of the assembling hole.

19. The electronic device as claimed in claim 10, wherein the electronic device further comprises a cable guide assembled at a side of the coupling mechanism for winding the electric cables connected to the main body and the display.

20. An electronic device comprising:
    a main body having two assembly portions spaced at a distal end thereof and located adjacent to two opposite sides of the main body;
    a display defining two assembling slots at a distal end of the display corresponding to the two assembly portions of the main body respectively; and
    a coupling mechanism positioned between the main body and the display for pivotally coupling the display to the main body and providing height adjustment of the display relative to the main body, the coupling mechanism comprising:
    two pivot assemblies rotatably mounted to the two corresponding assembly portions of the main body respectively; and
    two lifting assemblies respectively adjustably assembled to the two corresponding pivot assemblies, each lifting assembly comprising:
    a cylinder fixedly assembled and received within one corresponding assembling slot of the display;
    a first piston slidably assembled within the cylinder; and
    a piston rod with one end fixed to the first piston, wherein the opposite end of the piston rod is exposed to the exterior of the cylinder and fixed with one corresponding pivot assembly such that the display being pivotally and height adjustably assembled to the main body.

\* \* \* \* \*